Nov. 30, 1926.
J. R. GRAY
CULINARY UTENSIL
Filed March 18, 1925
1,609,114
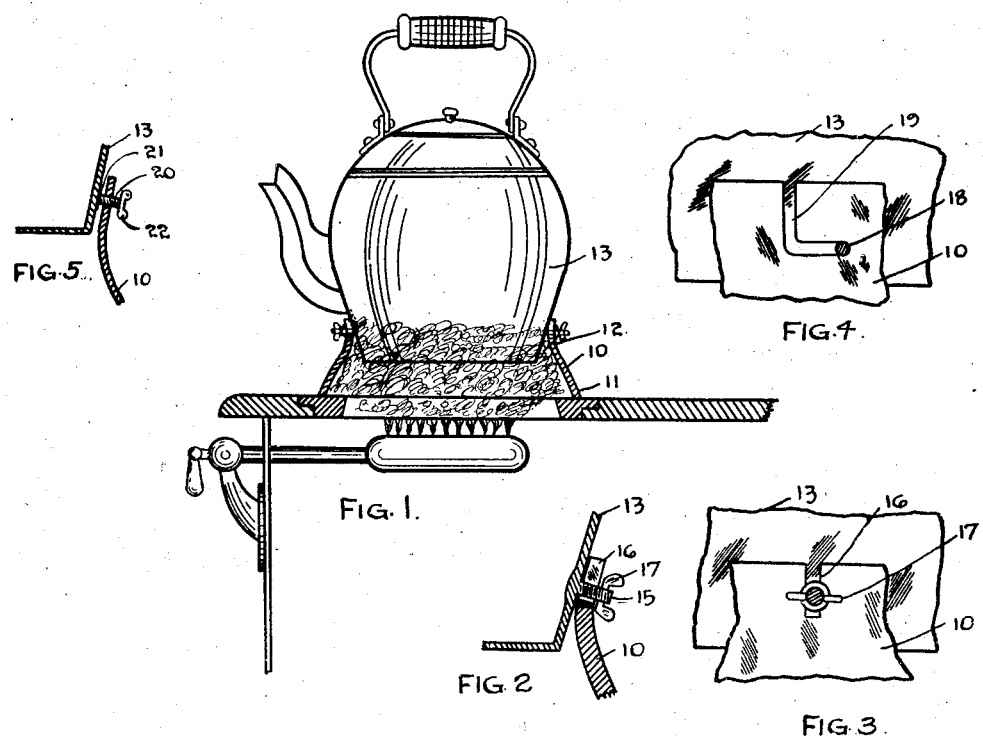
INVENTOR
J. R. Gray
By E. J. Fetherstonhaugh
ATTY Patented Nov. 30, 1926.

1,609,114

UNITED STATES PATENT OFFICE.

JOHN ROBERT GRAY, OF MONTREAL, QUEBEC, CANADA.

CULINARY UTENSIL.

Application filed March 18, 1925. Serial No. 16,474.

The invention relates to a culinary utensil, as described in the present specification and illustrated in the accompanying drawings that form part of the same.

The invention consists essentially of the novel combination of a vessel or other utensil and a flame container and heat director whereby the area of the heat zone from a burner or heat opening is restricted and confined to the purpose in hand.

The objects of the invention are to conserve fuel by using the heat generated to its utmost capacity; to increase the efficiency of kitchen heaters, particularly gas ranges; to eliminate the frequent accidents due to the straying flames and the consequent ignition of light clothing; to promote the combustion of the unconsumed gases, and generally to provide a serviceable, durable and economical utensil for kitchen and other uses.

In the drawings Figure 1 is a side elevation of a kettle showing the heat director in vertical section and riveted to the kettle.

Figure 2 is a sectional detail showing a modified way of fastening the director to the vessel.

Figure 3 is an elevation of the invention as illustrated in Figure 2.

Figure 4 is an elevation showing another modification of the fastening.

Figure 5 is a sectional detail of another means of fastening.

Like numerals of reference indicate corresponding parts in the various figures.

Referring to the drawings, the heat director is formed of a ring 10 of metal or other suitable material having a wall in close formation converging from the lower end to the upper end and preferably formed in cross section, the lower curve 11 forming the stand portion and the upper curve 12 meeting the vessel 13 shown in Figure 1 as a kettle for boiling water.

The screw studs 15 project outwardly from the kettle wall and the heat director is made with the vertical slots 16 into which said studs 15 are introduced and held by the butterfly nuts 17.

Another modification is shown in Figure 4 in which headed rivets 18 project from the kettle wall and fit and lock the heat director in the L-slots 19 extending inwardly from the top edge of the director.

A simple fastening is shown in Figure 5 whereby the thumb screws 20 are permanently in the air director wall adjacent to the upper end thereof and have a loose washer 21 at the end engaging the kettle wall and screwed tightly thereto by the thumb grips 22.

In the use of this invention the vessel is set over the burner in a gas stove or over the hole in a hard fuel cooking range and the hot gases resulting from the combustion of the fuel are retained under the vessel in the restricted area of the ring until fully consumed by the fire thus utilizing the heat to the limit of the fuel capacity and at the same time avoiding the escape of noxious fumes to the atmosphere, which are always in evidence where cooking is done with gas as the fuel and which are in this invention consumed to the betterment of the heating properties of the range.

The vessel is simply lifted on and off the range taking with it the heat director, which shields the flame from straying during the operation and thereby saves the person from burns and more serious consequences.

The use of stands of various kinds for culinary vessels is already known, but these are usually more or less complicated stands on which the vessel rests and are not made to receive a kettle or other vessel therein, for securing purposes or in any of the specific forms herein described and shown in the drawings or any reasonable departure therefrom.

What I claim is:—

A culinary device comprising a heat directing ring having vertical slots in its upper portion, and a vessel of such size as to fit into said heat ring, said vessel being provided with studs to fit within the slots and having butterfly nuts thereon to clamp the ring against the vessel.

Signed at Montreal, Canada, this 19th day of February, 1925.

JOHN ROBERT GRAY.